(12) United States Patent
Caslini et al.

(10) Patent No.: US 6,644,891 B2
(45) Date of Patent: Nov. 11, 2003

(54) COMPOSITION HAVING LOW THERMAL RESISTIVITY AND METHOD FOR LAYING UNDERGROUND CABLES FOR CARRYING ELECTRICAL ENERGY

(75) Inventors: Danilo Caslini, Caprino Bergamasco (BG) (IT); Fabrizio Donazzi, Milan (IT); Paolo Maioli, Crema (CR) (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/726,414

(22) Filed: Dec. 1, 2000

(65) Prior Publication Data

US 2002/0044836 A1 Apr. 18, 2002

Related U.S. Application Data

(63) Continuation of application No. PCT/EP99/03653, filed on May 26, 1999.
(60) Provisional application No. 60/088,844, filed on Jun. 10, 1998.

(30) Foreign Application Priority Data

Jun. 5, 1998 (EP) .............................. 98110292

(51) Int. Cl.$^7$ ................................. F16L 59/15
(52) U.S. Cl. ...................... 405/155; 405/157; 405/179; 106/900
(58) Field of Search ................. 405/129.25, 154.1–157, 405/174, 179; 106/900

(56) References Cited

U.S. PATENT DOCUMENTS

| | | | |
|---|---|---|---|
| 3,719,511 A | 3/1973 | Bevard et al. | 106/724 |
| 4,050,258 A | 9/1977 | Brewer et al. | 405/258.1 |
| 4,050,261 A | 9/1977 | Brewer et al. | 405/258.1 |

(List continued on next page.)

FOREIGN PATENT DOCUMENTS

| | | |
|---|---|---|
| EP | 0 379 421 A1 | 7/1990 |
| GB | 1504614 | 3/1978 |
| GB | 2 049 919 A | 12/1980 |

OTHER PUBLICATIONS

Das, Braja M., Priniciples of Geotechnical Engineering, 3rd, 1994, PWS Publishing Company, pps. 7, 8, 44.*
Mochlinski, K. et al., "Assessm ent of the Influence of Soil Thermal Resistivity on the Ratings of Distribution Cables", PRO C. IEE. vol. 123, No. 16, (Jan. 1976).
Donnazzi, F. et al., "Soil T hermal and Hy drological Characteristics in Designing Underground Cables", PRO C. IEE. vol. 126, No. 6, (Jun. 1979).
Furukawa Electric Co., Ltd., "Filler Composition for Cables or Transformers", Derwent Abstract of JP 53 007727, (Jan. 24, 1978).
Nippon Kokan Koji KK, "Fluidisation Back Filling Material and Back Filling for Pipes", Derwent Abstract of JP 6 017415, (Jan. 25, 1994).

*Primary Examiner*—Thomas B. Will
*Assistant Examiner*—Tara L. Mayo
(74) *Attorney, Agent, or Firm*—Finnegan, Henderson, Farabow, Garrett & Dunner, L.L.P.

(57) ABSTRACT

A system for carrying electrical energy in connections in underground cables. In particular, it relates to a method of laying cables and a trench filler having a low thermal resistivity, used for laying underground cables for carrying electrical energy. More particularly, it relates to the use of an inert filler to be disposed in an area around the cables or the parts of the system, such as joints, which are disposed underground. The method of laying cables disposed in a trench includes: removing the original soil to prepare the trench; disposing a first layer of a first composition in the trench; disposing the cables on top of the first layer; disposing a second layer of the first composition on top of the cables; disposing a third layer on top of the second layer formed by a second composition to fill the trench. The first composition comprises: 60–90% by weight of crushed sand; 4–15% by weight of silt; 2–12% by weight of cement; and 4–15% by weight of water.

13 Claims, 6 Drawing Sheets

U.S. PATENT DOCUMENTS

| | | | |
|---|---|---|---|
| 4,062,195 A | 12/1977 | Brewer et al. | 405/154.1 |
| 4,177,078 A | 12/1979 | Welna et al. | 501/130 |
| 4,361,661 A | 11/1982 | Jackson | 523/442 |
| 4,482,271 A | 11/1984 | Mitchell et al. | 405/157 |
| 4,911,584 A * | 3/1990 | Arenzana | 405/264 |
| 4,925,493 A | 5/1990 | Lamoreaux | 106/272 |
| 5,106,422 A | 4/1992 | Bennett et al. | 106/705 |
| 5,716,448 A * | 2/1998 | Furusawa et al. | 106/900 X |
| 6,042,305 A * | 3/2000 | Novich et al. | 106/900 |

* cited by examiner

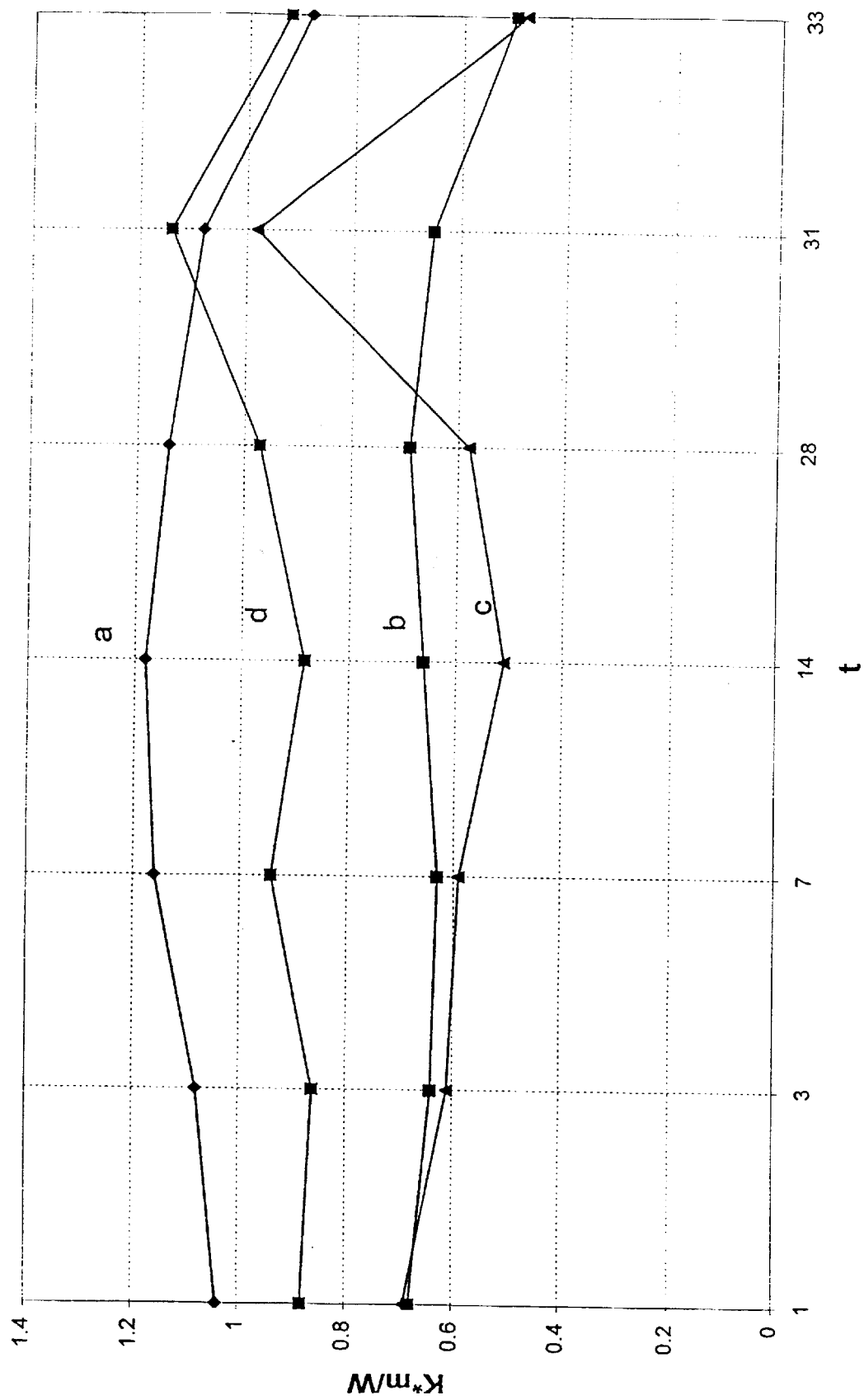

COMPOSITION HAVING LOW THERMAL RESISTIVITY AND METHOD FOR LAYING UNDERGROUND CABLES FOR CARRYING ELECTRICAL ENERGY

CROSS-REFERENCE TO RELATED APPLICATIONS

This application is a continuation of International Application No. PCT/EP99/03653, filed May 26, 1999, and claims the priority of European Patent Application No. 98110292.4, filed Jun. 5, 1998, and the benefit of U.S. Provisional Application No. 60/088,844, filed Jun. 10, 1998, the content of each of which is incorporated herein by reference.

BACKGROUND OF THE INVENTION

The present invention relates to a system for carrying electrical energy in connections made by means of underground cables.

In particular, it relates to a method of laying cables and a trench filler having a low thermal resistivity, used for laying underground cables for carrying electrical energy.

More particularly, it relates to the use of an inert filler to be disposed in an area around the cables or the parts of the system, such as joints, which are disposed underground.

The flow of current in the cables generates heat, and, if the filler disposed around the cables has a high thermal resistivity, not permitting satisfactory dissipation of the heat, this causes an increase in the temperature of the cables.

The increase in the temperature of the cables beyond the limits tolerated by them causes premature ageing of the cable with possible consequent failures of this cable.

The installation of a system for carrying electrical energy therefore requires the use of fillers having a low thermal resistivity which act in such a way that the cable cannot reach high temperatures and that it is capable of withstanding a higher current load.

In the normal practice of underground cable laying, a trench is excavated in the soil, and a bed of filler, generally consisting of sand, is prepared on the bottom of this trench. The bed of the said material is compacted with mechanical equipment having a vibrating plate. The cables are then laid on this bed. On completion of the laying of the cables, a layer of the same filler is deposited on top of them. Mechanical compaction is carried out on this layer also. The filling of the trench is completed by using inert quarried material, generally extracted on site or in the vicinity, except in those rare cases in which the original ground has a conformation which is particularly favourable for the dissipation of heat, or in which the said original soil has to be restored (as in the case of agricultural soil).

The practice of using inert filling material (sand) as the filler around the cables was adopted in the past particularly to prevent the presence of sharp stones in the original ground from causing damage to the cable sheath. Subsequently, the importance of the heat transmission of the said materials was recognized, and therefore attention was turned towards the search for more suitable fillers, with additional consideration of the stabilization, fluidization and moisture retention of the fillers.

The article by K. Mochlinski, "Assessment of the influence of soil thermal resistivity on the ratings of distribution cables", Proc. IEE, Vol. 123, No. 1, January 1976, describes the thermal behaviour of different types of ground. In particular, it discloses that sand, which contains a large proportion of materials having the particle size of silt, requires a high percentage of moisture for optimal compaction, greater than that which can be practically provided on site, thus limiting its use.

U.S. Pat. No. 4,177,078 discloses the use of a composition comprising soil, a stabilizing agent which includes a clay mixture, and a dispersing agent.

U.S. Pat. No. 3,719,511 discloses the use of a composition comprising sand, gravel, and large and fine stones, mixed with a cement filler such as Portland cement, and including a lubricant such as fuel oil.

U.S. Pat. Nos. 4,482,271 and 4,925,493 disclose the use of a composition comprising soil and wax.

U.S. Pat. Nos. 4,050,261, 4,062,195 and 4,050,258 disclose the use of a composition comprising Portland cement, aggregates and ash from the combustion of coal (fly ash).

U.S. Pat. No. 4,361,661 discloses the use of a composition comprising sand and an organic adhesive having a filler of inorganic fine particles.

The article by F. Donazzi, E. Occhini and A. Seppi, "Soil thermal and hydrological characteristics in designing underground cables", Proc. IEE, Vol. 126, No. 6, June 1979, describes the use of selected sands, having an optimized particle size distribution which provides a high density and consequently a small content of voids.

SUMMARY OF THE INVENTION

According to the present invention, the Applicant has invented a composition to be used as a trench filler, and having high thermal conductivity, a high degree of moisture retention and also a high thermal stability.

In a first aspect, the present invention relates to a method of laying cables disposed in a trench, comprising the phases of:

removing the original soil in such a way as to prepare the said trench;
disposing a first layer of a first composition in the said trench;
disposing the said cables on top of the said first layer;
disposing a second layer of the said first composition on top of the said cables;
disposing a third layer on top of the said second layer formed by a second composition in such a way as to fill the said trench;
characterized in that the said first composition comprises:
60–90% by weight of crushed sand;
4–15% by weight of silt;
2–12% by weight of cement;
4–15% by weight of water.

In particular, at least one of the said first, second and third layers is compacted mechanically.

Preferably, the said first and the said second layers have a density of more than 1.6 g/cm$^3$ in the dry state.

In a second aspect, the present invention relates to a method of laying cables disposed in a trench, comprising the phases of:

removing the original soil in such a way as to prepare the said trench;
disposing a first layer of a first composition in the said trench;
disposing the said cables on top of the said first layer;
disposing a second layer of the said first composition on top of the said cables;
disposing a third layer on top of the said second layer formed by a second composition in such a way as to fill the said trench;

characterized in that the said first composition comprises: crushed sand, silt, cement, and water, and has a thermal resistance less than or equal to 0.8 K*m/W.

In a third aspect, the present invention relates to a composition having low thermal resistivity and comprising:
60–90% by weight of crushed sand having a predetermined particle size;
4–15% by weight of silt;
2–12% by weight of cement;
4–15% by weight of water.

Preferably it relates to a composition comprising:
70–80% by weight of crushed sand having a predetermined particle size;
8–12% by weight of silt;
4–8% by weight of cement;
8–12% by weight of water.

Even more preferably it relates to a composition comprising:
75% by weight of crushed sand having a predetermined particle size;
10% by weight of silt;
5% by weight of cement;
10% by weight of water.

This composition is characterized in that the said sand is silica sand.

Preferably, the sand has a particle size in the range from 0.063 mm to 15 mm.

Preferably, the silt has a particle size in the range from 0.002 mm to 0.063 mm.

In a preferred embodiment, the inert sand and silt compound has a particle size distribution in the range from $$Y_u = -0.0649*x^6 + 1.5817*x^5 - 14.403*x^4 + 63.887*x^3 - 148.32*x^2 + 177.94*x + 5.1358$$

and $$Y_1 = -1.9512*x^4 + 13.836*x^3 - 34.44*x^2 + 63.498*x + 1.2669$$

where
$Y_u$ represents the upper limit of the percentage by weight of the material having a size x in mm, and
$Y_1$ represents the lower limit of the percentage by weight of the material having a size x in mm.

The thermal resistance which can be obtained with this composition is less than or equal to 0.8 K*m/W.

Preferably the cement used is of the Pozzolan type.

In a fourth aspect, the present invention relates to a system for carrying electrical energy by means of cables disposed in a trench, the said trench comprising:
a layer of a first composition;
the said cable is embedded in the said first layer;
a layer of a second composition disposed on top of the said first layer,
characterized in that the said first composition comprises:
60–90% by weight of crushed sand having a predetermined particle size;
4–15% by weight of silt;
2–12% by weight of cement;
4–15% by weight of water.

DESCRIPTION OF THE SEVERAL VIEWS OF THE DRAWINGS

Further details may be obtained from the following description, with reference to the attached drawings which show:

in FIG. 3, the measurements of thermal resistivity over time of samples mixed with cement and water;

DETAILED DESCRIPTION OF THE INVENTION

Figure 1:
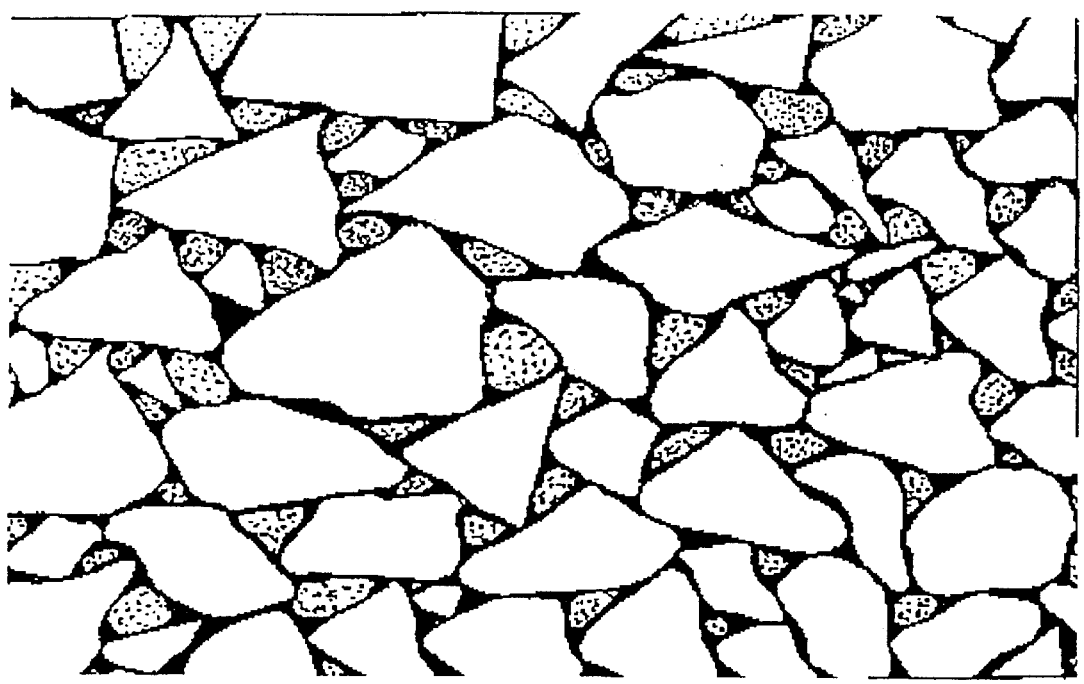
in FIG. 1, an aggregation diagram of the material according to the invention.

According to the present invention, it has been discovered that the composition of the filler having low resistivity comprises:
60–90% by weight of crushed sand having a predetermined particle size;
4–15% by weight of silt;
2–12% by weight of cement;
4–15% by weight of water.

Preferably it comprises:
70–80% by weight of crushed sand having a predetermined particle size;
8–12% by weight of silt;
4–8% by weight of cement;
8–12% by weight of water.

More preferably it comprises:
75% by weight of crushed sand having a predetermined particle size;
10% by weight of silt;
5% by weight of cement;
10% by weight of water.

The percentages by weight of the components described above may vary within the ranges shown above, for example according to the local conditions encountered during laying, while retaining their advantages. For example, the percentage of cement may be close to the upper limit in cases in which cables are laid in tubes embedded in the composition, where crushing of the filler is not required for the recovery of the cable.

For example, the use of a low percentage (less than 4%) of silt does not allow the desired results to be achieved, while a high percentage (more than 15%) prevents satisfactory compaction.

The sand forms the principal component of the filler because of its characteristics of low cost and good thermal conductivity. Crushed sands of silica composition are preferable, owing to the particular characteristics of compactibility, due to the presence of sharp granules with acute corners which provide a good intrinsic compactibility. Additionally, a further mechanical compaction enables a density of at least 1.8 g/cm³ in the dry state to be achieved.

In place of silica sands, the filler may be made from sands consisting of different materials (calcareous, quartz, feldspar, etc.), whether found in nature or artificial.

For the purposes of the present invention, the term "sand" signifies the fraction of the material (of the inert substance) having a particle size such that the size of the particles is within the range from 0.063 mm to 3.15 mm.

For the purposes of the present invention, the term "silt" signifies the fraction of the material (of the inert substance) having a particle size such that the size of the particles is within the range from 0.002 mm to 0.063 mm.

Preferably, according to the present invention, the inert substance consisting of silt and sand has a particle size distribution between the values shown in Table 1 below (also shown in FIG. 2), and represented by the following particle size curves.

Upper limit curve $Y_u$.

$$Y_u = -0.0649*x^6 + 1.5817*x^5 - 14.403*x^4 + 63.887*x^3 - 148.32*x^2 + 177.94*x + 5.1358$$

Lower limit curve $Y_1$.

$$Y_1 = -1.9512*x^4 + 13.836*x^3 - 34.44*x^2 + 63.498*x + 1.2669$$

where $Y_u$ and $Y_1$ represent the upper and lower limits respectively of the percentage by weight of the material and x represents the size of the material in mm.

This particle size is based on laboratory tests and is dictated by the necessity of having high compactibility and moisture retention. For a more detailed description, see the previously cited article by F. Donazzi et al.

TABLE 1

| Mesh size (mm) | Percentage by weight of undersize material Lower limit | Percentage by weight of undersize material Upper limit | Material |
|---|---|---|---|
| 0.038 | 3.6 | 11.7 | silt |
| 0.063 | 5 | 15 | silt |
| 0.09 | 6.5 | 20 | sand |
| 0.16 | 10 | 30 | sand |
| 0.3 | 18 | 46 | sand |
| 0.6 | 30 | 70.5 | sand |
| 1 | 42 | 85 | sand |
| 2 | 70 | 95 | sand |
| 3.15 | 100 | 100 | sand |

Table 1 shows the percentage of all undersize material for the corresponding mesh size of the screen (sieve) of the parts having the smaller sizes, up to grains with sizes equal to that of the screen. The percentage therefore represents the accumulated value for sand of all the fractions having sizes between those of two consecutive screens.

The material forming the silt may be obtained from a material different from that forming the principal fraction of the sand, and is added to the sand when this contains a lower percentage of it. The function of the silt in the mixture is to reduce the porosity of the compound, permitting good compaction of the filler and inhibiting the diffusion of the water. The silt has a particle size such that it does not interfere with the binding action of the cement which is added to the compound, and therefore enables the filler to have a good binding action. The result is that found for a material with a critical moisture content (a value below which the start of drying out occurs), below that of a natural soil, which considerably prolongs the moisture retention time and therefore impedes the onset of phenomena of moisture migration and subsequent thermal instability of the cables, even during long periods of dry weather. This characteristic is not obtained when fillers based on clay, bentonite or ashes are used.

One reason for this is that a composition containing clay is subject to considerable cracking if moisture is lost. This characteristic is considered to be highly negative, together with the possible leaching, a property common to all particles of small size, in periods of rainy weather in freely draining soils.

Ashes are used as a fluidizer of the filler, to facilitate the filling and self-compaction of the material; on the other hand, they are viewed negatively because of their low heat-conducting capacity.

The function of cement is to create a thermal bond by the formation of mechanical links between the various grains, at the time of setting. The quantity used, however, enables the cable to be recovered without damage if required for maintenance. The percentage of cement added may be increased, in particular, in cases in which the cable is laid inside a tube, in other words where the cable can be recovered without the necessity of breaking up the filler, thus making the filler more compact and therefore better suited to its purpose.

The function of the water is to enable the cement to set and to lubricate the compound, improving its compaction at the time of laying; in this way, the resulting compound has a good intrinsic density which can be improved by mechanical compaction.

The Applicant considers that the cement in the compound initially promotes the slipping of the sand grains, which have sharp edges as a result of the crushing of soil with a silica composition. This slipping causes a high compaction of the grains. Subsequently, the cement acts as a binder, creating mechanical links between the sharp edges of the particles. In this configuration, the water contained in the compound is trapped in the interstices between the particles, and most of it is absorbed by the contained silt. The silt therefore plays an important part which completes the water-retaining capacity of the composition. The function provided by the silt could also be obtained by using clay, which also has the capacity of absorbing large quantities of water. Unlike the silt, however, clay swells considerably in the presence of water, impeding the proper creation of the thermal links generated by the cement in the material. This causes the thermal resistance of the material to increase. FIG. 1 shows an aggregation diagram of the material according to the invention, in which the "thermal links" formed by the cement are shown in black, the sand grains are shown in white and the silt and water are shown in speckled white.

The material formulated in this way was studied in the laboratory, initially in the absence of cement, to determine its optimal particle size characteristics.

The filler mixtures used for the laboratory tests were prepared with different types of sand containing silt, namely:
a) Mixture prepared with sand from the "Nuova Demi" quarry at Brembate (BG), with a non-ideal particle size and with a density of 1.6 g/cm$^3$ in the dry state.
b) Mixture prepared with sand from the "Nuova Demi" quarry at Brembate (BG), with an ideal particle size and with a density of 1.8 g/cm$^3$ in the dry state.
c) Mixture prepared with sand from the "San Polo" quarry at Brescia, with a particle size close to or outside the lower limits of optimal particle size, with a density of 1.8 g/cm$^3$ in the dry state.
d) Mixture prepared with sand from the "San Polo" quarry at Brescia, mixed with fine sand and having a particle size close to or outside the upper limits of ideal particle size, with a density of 1.6 g/cm$^3$ in the dry state.

Figure 2:
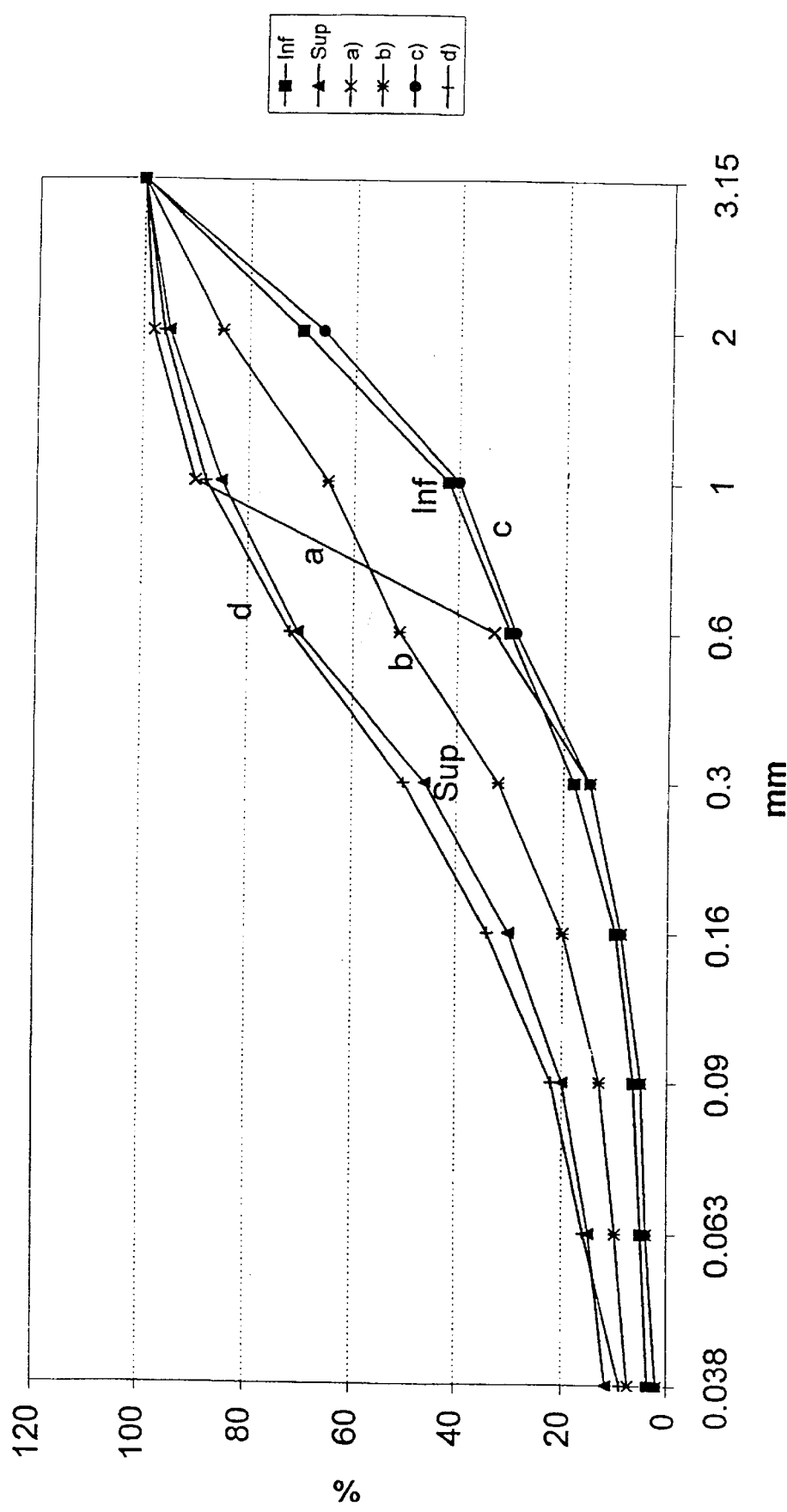
in FIG. 2, the variation of the particle size of four sands considered and the upper and lower limits of the variation of the particle size of the sand according to the invention.

The particle sizes of the aforesaid sands a, b, c, d are shown in FIG. 2 together with the lower (Inf) and upper (Sup) limits of the preferred particle size of the sand. The horizontal axis shows the size of the grains in mm, and the vertical axis shows the percentage (%) by weight of the grains.

For the purposes of the present invention, the "ideal particle size" signifies a preferred particle size within the limits defined in Table 1, and therefore within the lower and upper curves of FIG. 2.

The sands considered have four different variations of particle size. The particle size of mixture a) has a variation lying centrally between the two limits in the low range, while it goes beyond the upper limit in the high range of grain sizes. Mixture b) has a particle size lying centrally between the two limit curves, while the other two sands c) and d) have variations close to or outside the limits of the lower and upper curves.

The density in the dry state can be deduced from the density of the (moist) filler by using the following formula.

$$\delta_s = (\delta_u \times 100)/(U\% + 100)$$

where
$\delta_s$ is the density of the filler in the dry state
$\delta_u$ is the density of the filler
$U\%$ is the percentage moisture content of the filler.

The sands selected in this way were then mixed with cement, preferably of the Pozzolan type, of which the percentage by weight was 5%, and with water, of which the percentage by weight was 10%. It is also possible to use cement of the Portland type, but this produces a filler which is harder to break up than that using Pozzolan cement.

The mixtures produced in this way were used to prepare samples (approximately 20 cm in diameter and approximately 30 cm high), mechanically compacted to maintain the same compaction as before.

The following measurements were then made.
1. Measurement of the thermal resistivity of the mixtures in the dry state.
2. Measurement of the thermal resistivity of the mixtures, with water, one day after mixing with water.
3. Measurement of the thermal resistivity of the mixtures, with water, three days after mixing with water.
4. Measurement of the thermal resistivity of the mixtures, with water, seven days after mixing with water.
5. Measurement of the thermal resistivity of the mixtures, with water, fourteen days after mixing with water.
6. Measurement of the thermal resistivity of the mixtures, with water, 28 days after mixing with water.
7. Measurement of the thermal resistivity of the mixtures, 28 days after mixing and subsequent drying at 80° C. for 3 days.
8. Measurement of the thermal resistivity of the mixtures, 28 days after mixing and subsequent drying at 80° C. for 3 days and subsequent remoistening to the 10% water level.
9. Test of moisture migration under a heat gradient, conducted on the mixture found to have the best characteristics in the preceding tests (mixture with formulation b)).
10. Test of moisture retention, conducted on the preceding sample (mixture with formulation b)).

The results of the measurements are shown below in the form of tables and a graph.

of approximately 0.1 K*m/W, still water has a resistivity of 1.65 K*m/W, and still air has a resistivity of 40 K*m/W.

The results of the first measurement with the relative density are shown in Table 2.

TABLE 2

| Samples | type a) | type b) | type c) | type d) |
|---|---|---|---|---|
| Density in dry state (g/cm³) | 1.6 | 1.8 | 1.8 | 1.6 |
| Resistivity in dry state (K*m/W) | 3.6 | 1.9 | 2.4 | 3.8 |

The measurements (from 2 to 8) of the resistivity of the samples of the mixtures a), b), c) and d) have been plotted on the graph in FIG. 3, where the number of days elapsed is shown on the horizontal axis and the resistivity is shown on the vertical axis.

It should be noted that mixtures a) and b), having the same composition in the low range of particle size, but different degrees of compaction, have a stable value of thermal resistivity. Mixture b) which has a greater compaction, also has a low value of resistivity. Mixtures c) and d) have less stable values than mixtures a) and b).

On the basis of these results, mixtures b), c) and d) were selected for the subsequent test of migration and retention of moisture (measurements 9 and 10).

Mixture a) was rejected because it had a high thermal resistivity.

The results of these measurements are shown in Table 3. The measurements were made in the following way.

For each type of mixture, two samples of equal size, density and moisture content were taken.

One sample was sectioned in such a way that the moisture content could be measured at the points shown in Table 3, namely the top, central, bottom, and side points. The measurements made were taken as the initial measurement in Table 3.

The second sample was used for the test of moisture migration, which was conducted by using a watertight vertical vessel provided with a heating plate (top plate) and a cooling plate (bottom plate). This test consists in the application of a thermal gradient of 2° C. per centimeter for one week. The sample is then sectioned in the same way as the first sample and the moisture content is measured: this is shown in Table 3 as the final measurement.

TABLE 3

| | Point in the sample | | | | | | | |
|---|---|---|---|---|---|---|---|---|
| | Top | | Central | | Bottom | | Side | |
| Sand | Initial measurement | Final measurement | Initial measurement | Final measurement | Initial measurement | Final measurement | Initial measurement | Final measurement |
| b) | 8.8% | 8.2% | 8.5% | 8.5% | 9.5% | 10.2% | 8.3% | 8.8% |
| c) | 8.7% | 6.7% | 8.5% | 7.4% | 8.0% | 10.3% | 8.4% | 7.9% |
| d) | 9.2% | 8.3% | 9.0% | 8.6% | 8.7% | 10.1% | 8.4% | 8.3% |

The thermal resistivity of a composition depends primarily on its density, on the moisture content, and on the size and distribution of its components. It is defined as the temperature difference created between two opposite faces of a cube having a side of one meter, through which a thermal power of 1 watt (one joule per second) passes, and is measured in K*m/W. For example, quartz has a resistivity The results in Table 3 show that no significant variations of moisture were found in sample b), while a greater migration of moisture took place in the other samples, this being significant for sample c).

The moisture retention (measurement 10) was measured in one sample of mixture b) by placing it in a water-tight vessel and keeping it at ambient temperature for one week.

The measurement is designed to measure the gravitational effect on the moisture, which is known as "drainage".

The test demonstrated that mixture b), according to the present invention, showed a complete absence of drainage.

In conclusion, mixture b) was selected as the best of those tested; it comprises:
75% by weight of crushed sand having a predetermined particle size;
10% by weight of silt;
5% by weight of cement;
10% by weight of water.

This type of filler has been tested in a 1:1 scale experimental installation constructed at the Pirelli plant at Livorno Ferraris.

The test installation consists of a closed ring, 200 m in length, of 1×1600 mm² 90 kV XLPE insulated cable C.

Power was supplied to the cable in alternating current by 12 transformers of 26.5 kVA each. The current in the ring was regulated by a voltage controller with a power of 40 kVar. The temperature of the cable was monitored by means of thermocouples and distributed temperature sensors using optical fibres.

Figure 4A:
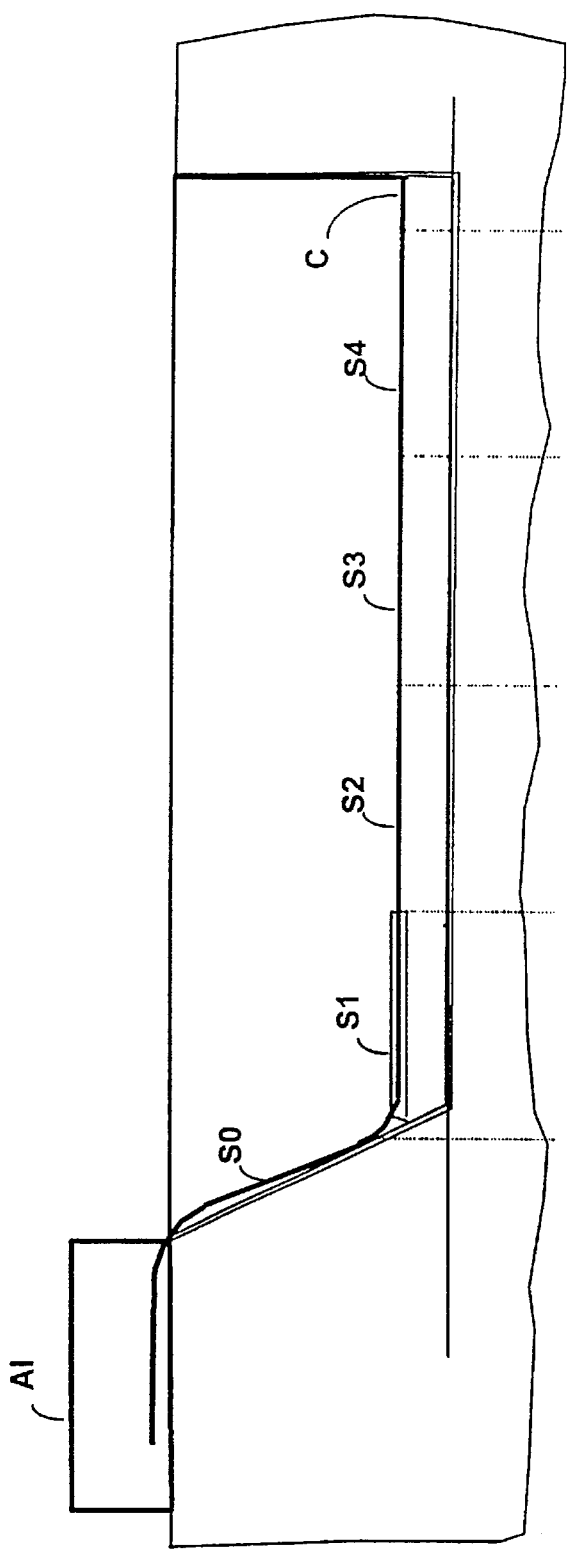
in FIGS. 4a and 4b, a schematic illustration of the test installation.
Figure 4B:
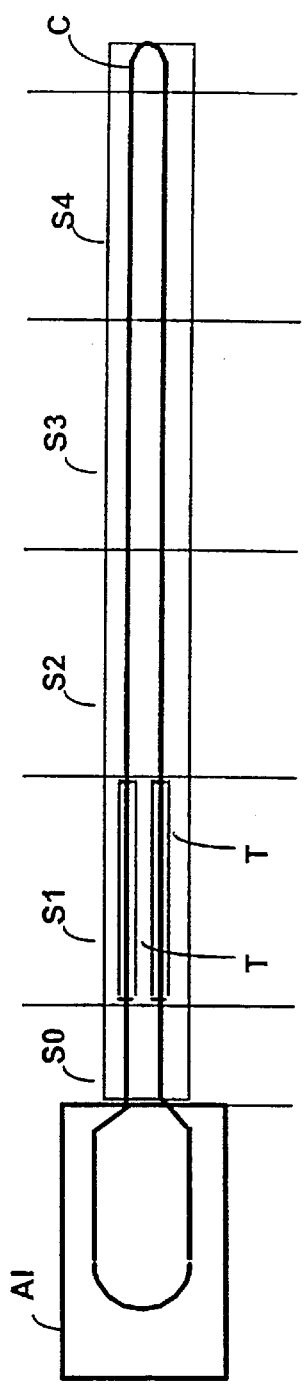

A schematic diagram of the test installation is provided in FIG. 4. In particular, FIG. 4a shows schematically a section through the installation comprising a circuit C of cable supplied by a power supply unit A1, divided into a number of sections: S0 which is the connecting section, and S1 to S4 which have different filler materials. FIG. 4b shows schematically a plan view of the installation comprising the same elements as FIG. 4a, in which two tubes T containing the cable C may be noted in the section S1. Each section S1–S4 is approximately 25 m long, and the two cables forming the circuit C are disposed with a distance of 0.3 m between them.

Figure 5:
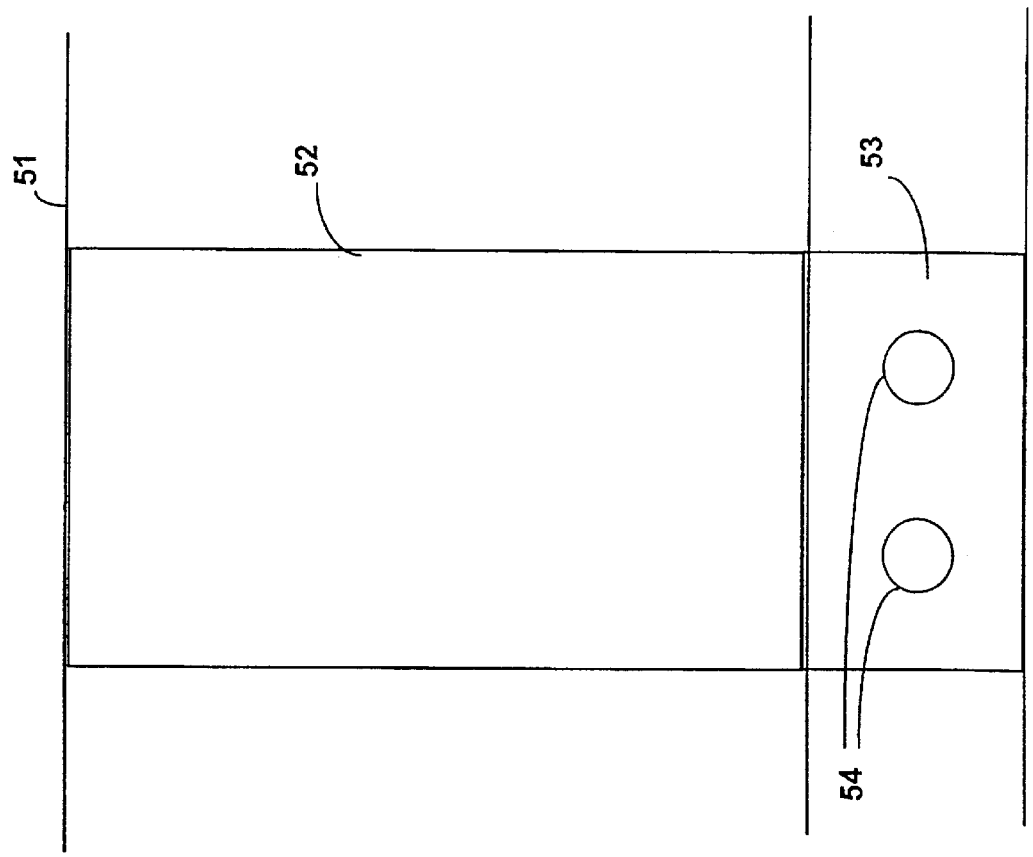
in FIG. 5, a schematic illustration of the trench of the test installation.

The ring is buried in a trench with a depth of 1700 mm and a width of 800 mm, and the filler material is disposed with a thickness of 500 mm, in the middle of which the cables are disposed. The dimensions of the filler are preferably optimized to contain the 60° C. isotherm, in other words to contain all the points which are at a temperature higher than or equal to 60° C. A schematic diagram of the trench is provided in FIG. 5.

Four consecutive areas (S1–S4) with different laying conditions were formed in the installation (see FIG. 4).

In the first area S1, the two branches of the cable C in the ring were laid in PVC tubes embedded in a filler consisting of the following materials whose percentages by weight are shown:

| | | |
|---|---|---|
| crushed sand | 68% | |
| silt | 10% | |
| cement | 12% | |
| water | 10% | |

In the second area S2, the cable C was laid in the filler according to the present invention, consisting of the following materials (percentages by weight):

| | | |
|---|---|---|
| crushed sand | 75% | |
| silt | 10% | |
| cement | 5% | |
| water | 10% | |

The material was compacted on site with a vibrating plate.

In the third consecutive area S3, the cable C was laid in a filler consisting of non-selected crushed sand, with a particle size range limited to two principal particle sizes, having the following percentages by weight:
50% of silica sand with a particle size in the range from 0.1 mm to 0.3 mm
50% of silica sand with a particle size in the range from 2 mm to 3 mm.

The material was compacted on site with a vibrating plate, in order to impart to it a density of 1.6 g/cm³ as measured in the laboratory. The filler intentionally had a high percolation capacity.

In the fourth area S4, the cable C was laid in a filler made up in exactly the same way as the filler of the second area S2 which is the object of the patent, but without cement and compacted mechanically.

Figure 6:
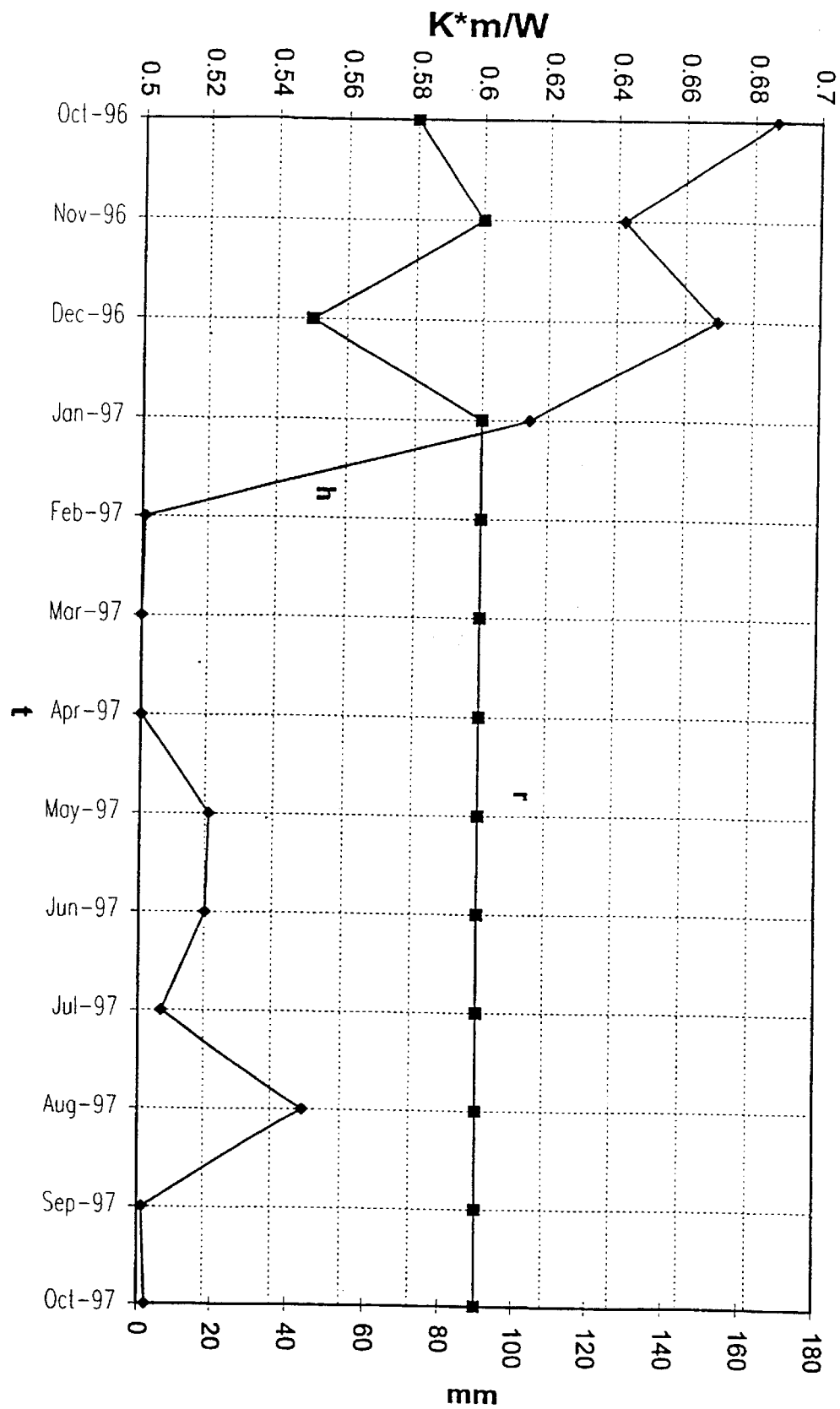
in FIG. 6, the variation of the thermal resistivity measured in the filler in question during the year of testing and the variation of rainfall during the year.

FIG. 6 shows the variation of thermal resistivity measured in the filler of the second area S2 during the year of testing, together with the local rainfall measured in mm of rain for each month. In particular, the horizontal axis shows the time (in months), the left-hand vertical axis shows the thermal resistivity and the right-hand vertical axis shows the mm of rainfall in the month.

The results of the tests show that the resistivity of the filler of the second area remains constant with time at a value of less than 0.8 and close to 0.6 K*m/W, which is a good approximation of the laboratory value. However, the other fillers under observation showed irregular values variable with time from an upper limit in dry weather to a lower limit in wet weather. The year of testing was rather dry and this enabled the said optimal thermal behaviour of the filler to be observed. In particular, the resistivity did not increase, and remained at less than 0.7 K*m/W through the variation of the climatic conditions in the year of testing.

The tests showed as the capacity of this filler described above to retain water on its internal makes it a particularly suitable material for laying cables for carrying electrical energy, owing to the high capacity of dissipating the heat produced by the cables, enabling the transmission capacity to be increased.

Because of the low resistivity of the composition, it is thus possible to dissipate more of the heat developed by the electrical losses of the cables, enabling the cables to operate at a lower temperature.

Alternatively, it is possible to increase the carrying capacity (in current) of the cable, while maintaining an acceptable temperature for the cable.

Additionally, the capacity to retain water inside it makes this filler a very useful material for laying cables in difficult conditions, for example where there are long dry periods in the summer.

The system produced in this way, consisting of the cable and the trench filler, enables the electrical energy carrying capacity to be increased by 15% by comparison with systems having conventional fillers, with the same cross-section of the trench filled with the composition to which the present invention relates.

What is claimed is:

1. A method of laying cables in a trench, comprising the steps of:

removing the original soil to prepare said trench;

disposing a first layer of a first composition in said trench;

disposing said cables on top of said first layer;

disposing a second layer of said first composition on top of said cables;

disposing a third layer on top of said second layer formed by a second composition to fill said trench;

wherein:
said first composition comprises:
60–90% by weight of a crushed sand;
4–15% by weight of a silt;
2–12% by weight of a cement; and
4–15% by weight of water;
said sand having a particle size in the range of 0.063 mm to 3.15 mm, and
said silt having a particle size in the range from 0.002 mm to 0.063 mm.

2. The method of laying cables according to claim 1, wherein said first layer is compacted mechanically.

3. The method of laying cables according to claim 1, wherein said second layer is compacted mechanically.

4. The method of laying cables according to claim 1, wherein said third layer is compacted mechanically.

5. The method of laying cables according to claim 1, wherein said first and said second layers have a density of more than 1.6 g/cm$^3$ in the dry state.

6. The method of laying cables according to claim 1, wherein said first composition has a thermal resistance less than or equal to 0.8 K*m/W.

7. A composition having low thermal resistivity and comprising:
60–90% by weight of a crushed sand;
4–15% by weight of a silt;
2–12% by weight of a cement; and
4–15% by weight of water
said sand having a particle size in the range from 0.063 mm to 3.15 mm, and
said silt having a particle size in the range from 0.002 mm to 0.063 mm.

8. The composition according to claim 7, comprising:
70–80% by weight of sand;
8–12% by weight of silt;
4–8% by weight of cement; and
8–12% by weight of water.

9. The composition according to claim 7, comprising:
75% by weight of sand;
10% by weight of silt;
5% by weight of cement; and
10% by weight of water.

10. The composition according to claim 7, wherein said sand is silica sand.

11. The composition according to claim 7, wherein said composition has a thermal resistance less than or equal to 0.8 K*m/W.

12. The composition according to claim 7, wherein said cement is of the Pozzolan type.

13. A system for carrying electrical energy by means of cables disposed in a trench, said trench comprising:
a layer of a first composition in which said cable is embedded;
a layer of a second composition on top of said first layer,
wherein:
said first composition comprises:
60–90% by weight of a crushed sand;
4–15% by weight of a silt;
2–12% by weight of a cement; and
4–15% by weight of water;
said sand having a particle size in the range of 0.063 mm to 3.15 mm, and
said silt having a particle size in the range from 0.002 mm to 0.063 mm.

* * * * *